United States Patent
McMenamy

(10) Patent No.: US 11,698,099 B1
(45) Date of Patent: Jul. 11, 2023

(54) APPARATUS FOR SEQUENTIAL RETRACTION OF LOCKING PINS BY A SINGLE PULL HANDLE

(71) Applicant: James Bruce McMenamy, Clackamas, OR (US)

(72) Inventor: James Bruce McMenamy, Clackamas, OR (US)

( * ) Notice: Subject to any disclaimer, the term of this patent is extended or adjusted under 35 U.S.C. 154(b) by 0 days.

(21) Appl. No.: 18/173,271

(22) Filed: Feb. 23, 2023

Related U.S. Application Data

(60) Provisional application No. 63/268,601, filed on Feb. 26, 2022.

(51) Int. Cl.
*F16C 1/10* (2006.01)
*F16C 1/14* (2006.01)

(52) U.S. Cl.
CPC .............. *F16C 1/106* (2013.01); *F16C 1/14* (2013.01)

(58) Field of Classification Search
CPC .......... E05B 53/005; E05B 79/20; F16C 1/10; F16C 1/101; F16C 1/102; F16C 1/103; F16C 1/105; F16C 1/106; F16C 1/12; F16C 1/14; F16C 1/145; F16C 1/16
See application file for complete search history.

(56) References Cited

U.S. PATENT DOCUMENTS

| | | | | |
|---|---|---|---|---|
| 1,601,976 A | * | 10/1926 | Mayer | F16C 1/12 |
| | | | | 74/502 |
| 1,857,654 A | * | 5/1932 | Mylar | B60K 15/05 |
| | | | | 70/379 R |
| 2,101,348 A | * | 12/1937 | Schellinger | B60K 15/05 |
| | | | | 220/301 |
| 2,234,623 A | * | 3/1941 | Crouse | F16C 1/16 |
| | | | | 74/502 |
| 2,572,730 A | * | 10/1951 | Jones | B60K 15/05 |
| | | | | 292/171 |

(Continued)

FOREIGN PATENT DOCUMENTS

| | | | |
|---|---|---|---|
| CN | 213109767 U | * | 5/2021 |
| DE | 3405892 A1 | * | 8/1985 |

(Continued)

OTHER PUBLICATIONS

Machine Translation of FR-775535-A.*

(Continued)

*Primary Examiner* — Richard W Ridley
*Assistant Examiner* — Brian J McGovern

(57) ABSTRACT

A cable release comprises a control handle, at least one retractable latch pin, and cables connected from the handle to the latch pins. The handle assembly includes a cup with a non-round orifice at one end. A rod within the cup passes through the handle allowing it to spin, so twisting the handle does not cross up its attached control lines. The latch pin assembly includes another cup and a set screw so that a stop tube may be inserted adjustably to establish a gap length between the stop tube and the retractable latch pin in the cup. A spring between the stop tube and a flange of the pin extends the pin when not pulled into a retracted position by the handle. Varying pin lengths and stop tube gaps allows a single pull of the handle to effect simultaneous or sequential releases of articles retained by the pins.

22 Claims, 5 Drawing Sheets

(56) References Cited

U.S. PATENT DOCUMENTS

| | | | | |
|---|---|---|---|---|
| 2,932,214 | A * | 4/1960 | Crouse | F16C 1/22 |
| | | | | 74/502 |
| 2,948,443 | A * | 8/1960 | Cissell | D06F 73/00 |
| | | | | 223/67 |
| 3,443,452 | A * | 5/1969 | Shontz | F16C 1/16 |
| | | | | 74/502 |
| 3,820,361 | A * | 6/1974 | Leitner | E05B 83/16 |
| | | | | 180/289 |
| 4,881,423 | A * | 11/1989 | Troiano | B60R 22/44 |
| | | | | 74/501.5 R |
| 5,048,878 | A * | 9/1991 | Takeshita | E05B 63/0056 |
| | | | | 292/171 |
| 5,913,944 | A * | 6/1999 | Haynes | F16C 1/16 |
| | | | | 74/502.6 |
| 6,085,611 | A * | 7/2000 | Valdez | F16C 1/14 |
| | | | | 74/502.2 |
| 2002/0088297 | A1* | 7/2002 | Lin | B60T 11/06 |
| | | | | 74/500.5 |
| 2002/0146280 | A1* | 10/2002 | Wu | B60T 11/046 |
| | | | | 403/300 |
| 2009/0072520 | A1* | 3/2009 | Ehrenreich | B62L 3/00 |
| | | | | 280/642 |
| 2020/0018096 | A1* | 1/2020 | Dyer | B64C 1/1461 |

FOREIGN PATENT DOCUMENTS

| | | | |
|---|---|---|---|
| FR | 775535 | A * | 12/1934 |
| FR | 850578 | A * | 12/1939 |
| FR | 890098 | A * | 1/1944 |
| FR | 974945 | A * | 2/1951 |
| FR | 974947 | A * | 2/1951 |
| GB | 781689 | A * | 8/1957 |

OTHER PUBLICATIONS

Machine Translation of CN-213109767-U.*
Machine Translation of FR-890098-A.*
Machine Translation of FR-974945-A.*
Machine Translation of DE-3405892-A1.*
Machine Translation of FR-974947-A.*

* cited by examiner

A-A

APPARATUS FOR SEQUENTIAL RETRACTION OF LOCKING PINS BY A SINGLE PULL HANDLE

CROSS REFERENCE TO RELATED APPLICATION

This non provisional utility application claims the benefit of and priority to U.S. provisional application 63/268,601 "Apparatus for Sequential Retraction of Locking Pins by a Single Pull Handle," filed 26 Feb. 2022. The entire contents of U.S. provisional application 63/268,601 "Apparatus for Sequential Retraction of Locking Pins by a Single Pull Handle," filed 26 Feb. 2022 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to a cable pull apparatus by which actuations of a single handle effect several sequential or simultaneous mechanical lock-in or release actions.

BACKGROUND

There are many sorts of industrial tasks which may be performed more productively if more than one mechanical action could be physically combined into a one-handed task. Thus freed, a worker may use the other hand for other tasks, for physical balance, or for hand signaling so that other workers might execute synchronous actions in time with the one-handed task.

BRIEF DESCRIPTION

A primary objective of the invention is to provide a multiple cable-pull mechanism so that several cable-operated lock-in or release actions may be executed by a motions of just one hand actuation of one handle.

Another objective of the invention is to provide an adjustable cable-pull mechanism whereby a single pull of a single control handle may effect a sequence of mechanical actions spaced apart along the actuation length of the control handle.

Yet another objective of the invention is to provide an adjustable cable-pull mechanism whereby a single pull of a single control handle may effect two or more simultaneous actions beyond the reach of a worker's hands.

A corollary objective of the invention is to decouple rotation of the control handle from components which draw a plurality of control cables so that partial or complete revolutions of the control handle do not twist any one control cable around any other control cable.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sublabel, it is intended to refer to all such multiple similar components.

FIG. 4b shows an alternative embodiment of a pull handle for the control handle assembly of FIG. 4a.

DETAILED DESCRIPTION OF CERTAIN EMBODIMENTS

Figure 1:
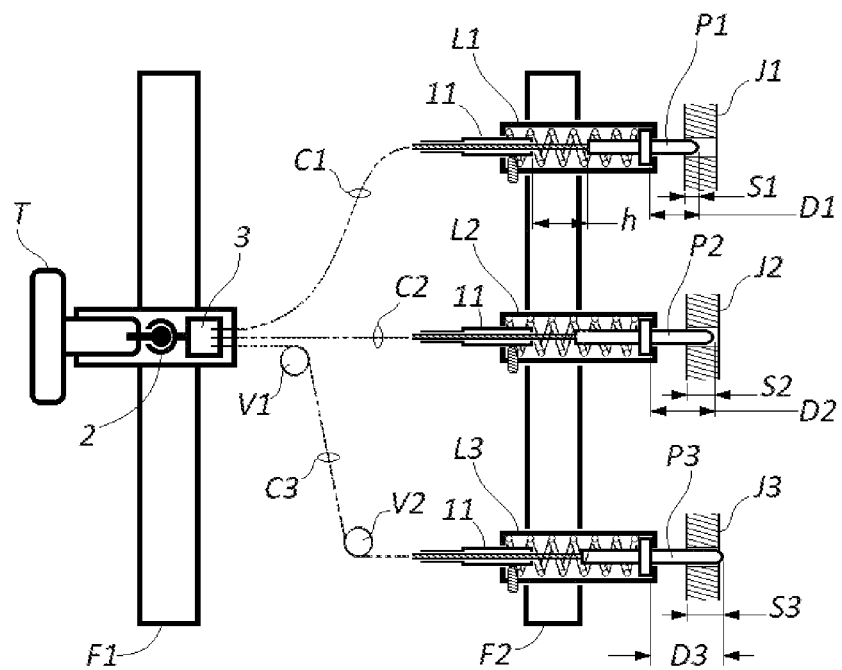
FIG. 1 shows a stylized view of components in accordance with the invention arranged for a sequential mechanical release of several parts by a single pull of a single control handle.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Also in this specification, the term "means for . . . " as used herein including the claims, is to be interpreted according to 35 USC 112 paragraph 6.

Furthermore, in this specification the use of the verb "effect" as a transitive verb is exacting and intentional, and not to be confused with the use of the verb "affect." Also, in this specification the word "cable" may refer to string, rope, line, or a strand of material, but in preferable embodiments refers to a rope consisting of a plurality of strands of metal wire laid into a helix.

A cable release comprises a control handle, at least one retractable latch pin, and cables connected from the handle to the latch pins. The handle assembly includes a cup with a non-round orifice at one end. A rod within the cup passes through the handle allowing it to spin, so twisting the handle does not cross up its attached control lines. The latch pin assembly includes another cup and a set screw so that a stop tube may be inserted adjustably to establish a gap length between the stop tube and the retractable latch pin in the cup. A spring between the stop tube and a flange of the pin extends the pin when not pulled into a retracted position by the handle. Varying pin lengths and stop tube gaps allows a single pull of the handle to effect simultaneous or sequential releases of articles retained by the pins.

Referring now to the figures, FIG. 1 shows a stylized view of components in accordance with the invention arranged for a sequential mechanical release of several parts [J1,] [J2,] and [J3,] by a single pull of a single control handle [T.] The cable release mechanism comprises a control handle assembly, at least one retractable latch pin assembly, and at least one control cable connected from the control handle assembly to a latch pin assembly.

The control handle assembly is secured to a first frame component [F1] and the responding retractable latch pin assemblies [L1,] [L2,] and [L3] are mounted to a second frame component [F2.] The retractable latch pin assemblies do not have to be mounted all on the same frame component, but may be located at several different distances from the control handle assembly such that pin retractions effected by a single actuation of the control handle may release several distant components at several different locations in a predetermined sequence.

Each retractable pin assembly has a wire rope or cable [C1,] [C2,] and [C3] attached to a single wire receiving component [3] in the control handle assembly. A rotatable coupling [2] connects the handle to the wire receiving component. In prior art control handle assemblies the cable attachment point is directly connected to the pull handle, so that if a user twists the handle while pulling this motion would also twist the cables that enter the assembly. The crossed-up cables frequently cause malfunctions such as binding the handle and disabling extension motions of the latch pins when the control handle is released. Crossed-up conditions also damage and weaken the control cables and lead to fraying and failures.

As a solution to this condition, the inventive control handle assembly rotationally de-couples the handle from any angular displacement of the several control cables attached to it, so that twisting the handle does not twist the pull rod that pulls the cables and does not cross-up the cables themselves.

The cables may be different lengths and a pull distance at the control handle may effect two different retraction distances based on the settings of retraction stops at the different pin ends. The difference in retraction distances is effected by differential compression of the two pin extension springs while they are retracted.

Stop tubes [11] at each of the latch pin assemblies may be adjusted so that the pin retracts to a stop while continuing to allow the cable to be pulled, further compressing the extension return spring. For example in this figure, while first and second pins and are being retracted together, a first pin may be arrested from further retraction while the handle is partially pulled, but the full pull distance of the handle is halted by a hard retraction stop at the second pin.

This differential cable stopping action is enabled by judicious adjustment of the clearances [h] between the cable attachment ends of the latch pins and the stop tubes.

For the parts being retained or sequentially released by pulling the control handle, the insertion depths [S1,] [S2,] and [S3] into the parts may be controlled by axial spacing of the parts to their respective latching pin assemblies, or by manufacturing latch pins [P1,] [P2,] and [P3] to have different nose lengths [D1,] {d2} and [D3,] or both of these methods. In this particular illustrated example, a continuous pull on the handle would first retract pin [P1] free of part [J1,] then retract pin [P2] free of part [J2,] and lastly pin [P3] would retract from part [J3.]

According to preferable embodiments, the control cables are sheathed by tubular shields which attach, clamp to, or crimp to the retraction stop tubes. The control cable is a wire rope connected from the control handle of the cable release mechanism to at least one retractable latch pin assembly.

According to a preferable arrangement and adjustment of the latch pin assemblies, full retraction of the control handle leaves only a small portion of the ball ends of the latch pins protruding.

Thus a 1" long stainless steel stop tube that slides into the longitudinal aperture of the cup component of the latch assembly may be locked to a particular insertion depth by means of a set screw, where it would then acts as a retraction stop for the entire concert of latch pins when the latch pin in that assembly arrived at the internally inserted end of the tube. The retraction stop provides feedback to user that retraction is complete.

Using other currently available devices lacking these stops, a user might be able to pull a cable out of its sleeve, which would mis-align and damage the mechanism. Lastly, although preferred embodiments use sheathed control cables such as the familiar arrangement of sheathed bicycle brake control cables, it is also possible to use the invention with unsheathed cables such as [C3] in this exemplary illustration, which passes through fairlead pulleys [V1] and [V2.]

Figure 2:
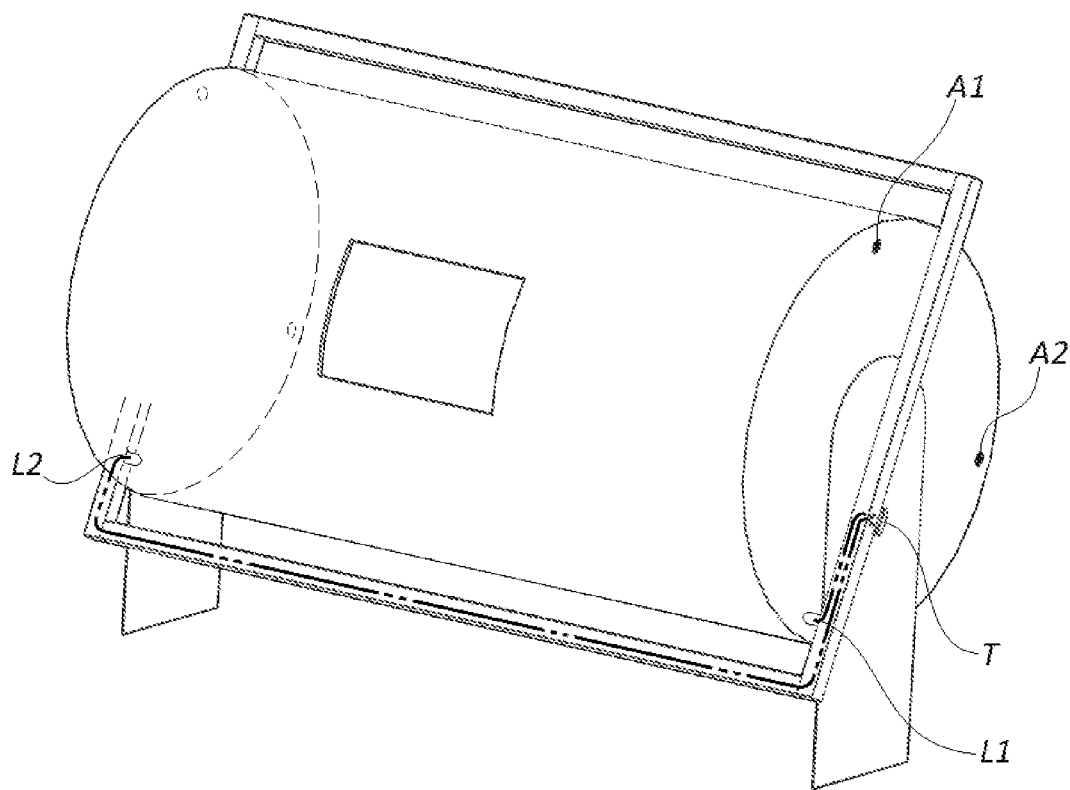
FIG. 2 shows an oblique view of an alternative embodiment of the invention which offers simultaneous release actions at two remote points effected by a single pull of a single control handle.

FIG. 2 shows an oblique view of an alternative embodiment of the invention which offers simultaneous release actions at two remote points [L1] and [L2] effected by a single pull of a single control handle [T.] The application shown is a rotatable drum for tumbling or random mixing of the contents of the drum, such as for a random draw lottery of its contents.

Apertures [A1] and [A2] and others in the end plates of the drum receive the locking pins to fix the drum at an access position shown, an access position facing the opposite side of the drum, and a downward-facing position to empty the contents of the drum. The drum could be rotated with the pin tips of latches [L1] and [L2] riding along the outer surfaces of the end plates of the drum until a pair of angularly aligned apertures in the two drum end plates align with the latch pins. At that moment the springs in the latch pin assemblies would simultaneously drive their respective pins into the aligned apertures and rotationally lock the drum in position.

The handle may be twist-locked in a retracted position which also holds the locking pins back in retracted positions for free rotation of the drum. A "dog" or transverse protuberance on the T-handle cooperating with a slotted shroud component of the control handle assembly is one means for twist locking the handle in a retracted position. Other known lock-out mechanisms may be incorporated into the control handle assembly. When a user releases the control handle from its retracted position, the pins are allowed to extend and the tapered portions of the pins will cooperate to center into their respective apertures in the end faces of the drum. A quick release is available as soon as even a slight retraction begins.

Figure 3:
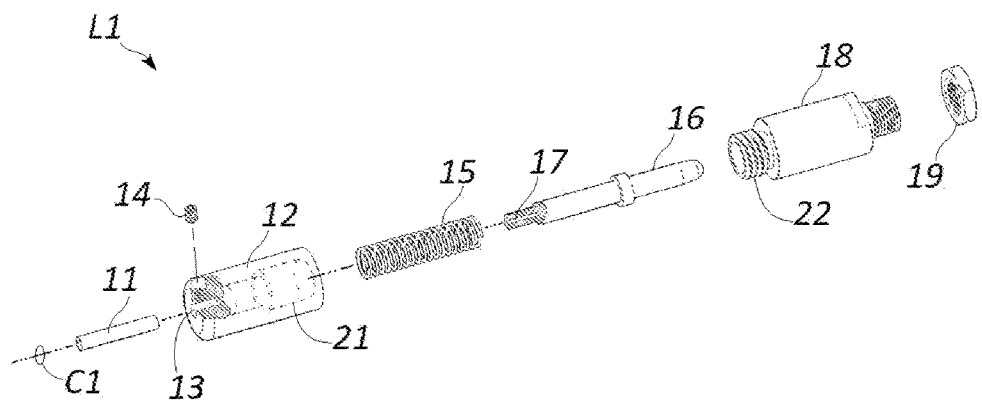
FIG. 3. shows an oblique exploded view of components of a latch pin assembly in accordance with the invention.

FIG. 3 shows an oblique exploded view of components of a latch pin assembly [L1] in accordance with the invention. The latch pin assembly comprises a cup [12] with a first, longitudinal aperture extending from its first end to its second end. The aperture has internal threads [21] at this first end which are used to couple to external threads [22] of a barrel component [18.] The barrel has first and second ends and first and second external threads at its respective ends, with the first external threads of the barrel received within the internal threads of the cup.

The cup has a second, transverse aperture having internal threads and communicating with the longitudinal aperture so that a set screw [14] may be threaded into this aperture to impinge on a stop tube [11.] The insertion depth of the stop tube into a smaller aperture [13] of the longitudinal aperture at the second end of the cup is adjusted and then the set screw locks it in place to establish a clearance distance between the cable attachment end of the latch pin [16] and the stop tube. A retracted position may be defined and adjustable to allow a portion of the ball end of the latch pin to remain extended or adjusted to retract fully into the barrel.

The latch pin is a retractable rod partially received within the longitudinal aperture of the cup and it is made with a first diameter and a first end having a rounded tip. The opposite end of the pin is a second end having an aperture [17,] and the pin includes a medial flange partway but preferably close to the middle of its length which is of a diameter greater than the first diameter of the rod.

A longitudinally compressible member [15] is disposed between the medial flange of the rod and the second end of the cup, so it resides within the cup when compressed by the threaded end of the barrel seating into the cup. The compressible member is an elastic component made of an elastic material or preferably a helical coil spring. A control cable [C1] connected from the control handle assembly includes a wire rope that passes through the stop tube, the longitudinal aperture of the cup, and the coil spring and is received within the aperture of the retractable rod (latch pin) and may secured by a crimp, or solder, or an adhesive or the like.

The ball end of the latch pin allows it to be used as a detent if a user were to seat this end into a spherical depression in a part or if seated into a locating hole in the part which is smaller than the pin diameter so that only a portion of the ball end seats the hole, even if the axis of the hole is not perfectly aligned with the centroid of the bell end of the pin. The invention may be used thusly as a detent with a safety release action after a certain lateral force transverse to the axis of the latch pin is exceeded. In another preferred embodiment the first end of the latch pin of this retractable latch pin assembly further comprises a tapered conical section such as a 4° taper adjacent to a bullet nose which may be a spherical tip or an ogive tip.

Most control cables include sheathing around the wire rope component of the cable, and this sheathing is preferably joined to the distal end of the stop tube by means of a clamp or a section of tubing which receives both the sheathing and the stop tube. Heat shrink tubing may be used optionally in conjunction with adhesive or an external clamp to connect the cable sheath to the stop tube. A nut [19] threadably engages onto a second set of external threads on the barrel for securing the latch pin assembly to a frame or a plate.

Figure 4A:
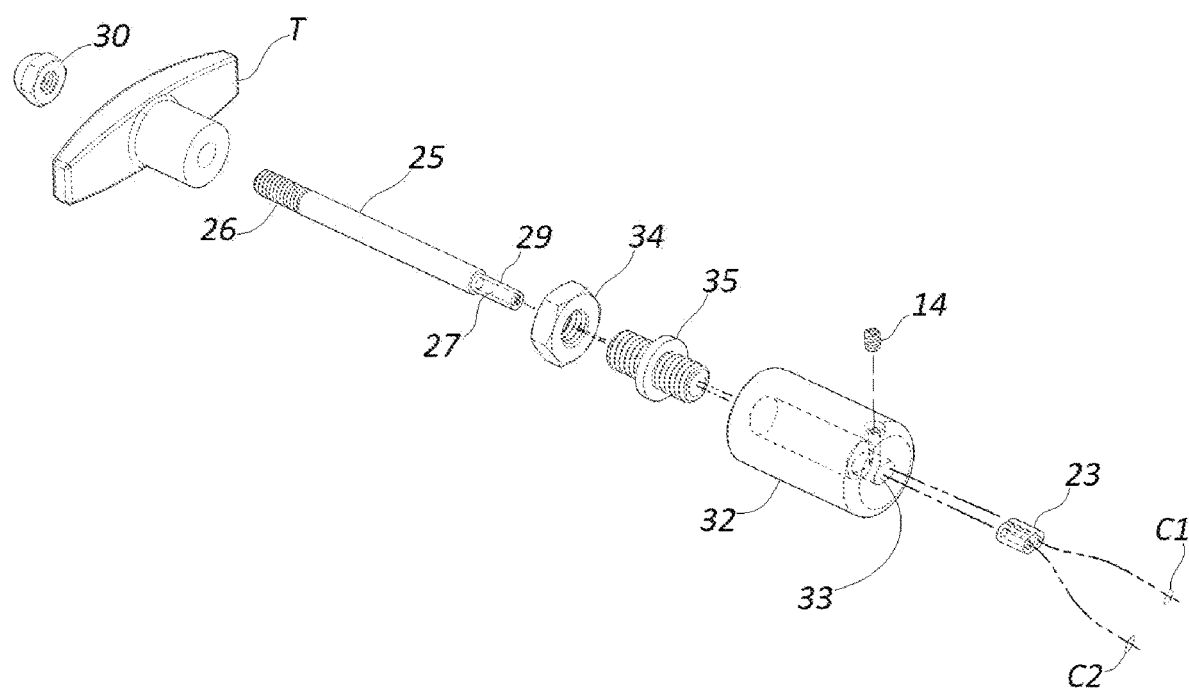
FIG. 4a shows an oblique exploded view of components of a control handle assembly in accordance with the invention.

FIG. 4a shows an oblique exploded view of components of a control handle assembly in accordance with the invention. The control handle assembly further comprises a cup [32] with a first longitudinal aperture extending from its first end to its second end, with the aperture having internal threads at its first end and a non-round orifice [33] at its second end. A pull rod [25] is partially received within the longitudinal aperture of the cup, and a handle [T] is rotatably coupled to the rod.

A non-round ferrule [24] having an external cross section complementary to the non-round aperture in the cup guides incoming control lines which jointly attach to the pull rod. The cup has a second transverse aperture with internal threads that communicate with its longitudinal aperture so that the ferrule may be inserted into the smaller orifice of the longitudinal aperture and secured by a set screw [14.] The ferrule has at least one lumen but a preferable arrangement for reducing the possibility of control lines becoming crossed-up during use includes a plurality of lumina so that each control line passes through an individual lumen dedicated to that line.

Figure 8:
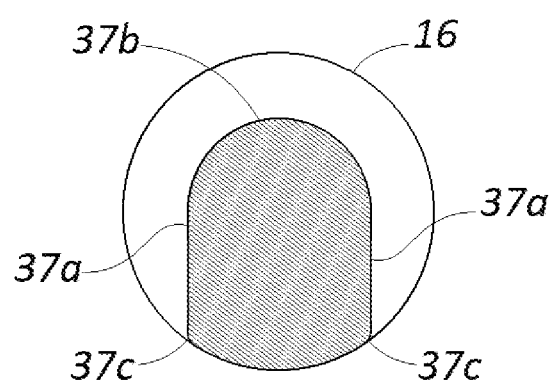
FIG. 8 shows a cross section view of another alternative cross section for a latch pin in accordance with the invention.

In this example for two control lines [C1] and [C2,] the ferrule has figure-8 cross section and fits closely within an oval aperture on the second end of the cup. Each of the control lines in this cable release mechanism is a wire rope which connects from a retractable latch pin assembly and passes through its own lumen of the ferrule and is received into an aperture [27] at the second end [29] of the pull rod.

The other end of the pull rod is a first externally threaded end [26] which passes through a central aperture in the pull handle and is received within the internal threads of a cap nut [30] such as an acorn nut.

A double-ended threaded coupling [35] includes a first set of external threads for inserting and engaging with the internal threads in the first end of the cup, and a second set of external threads received within a nut [34] for securing the control handle assembly to a frame or a plate or similar structural elements.

Figure 4B:
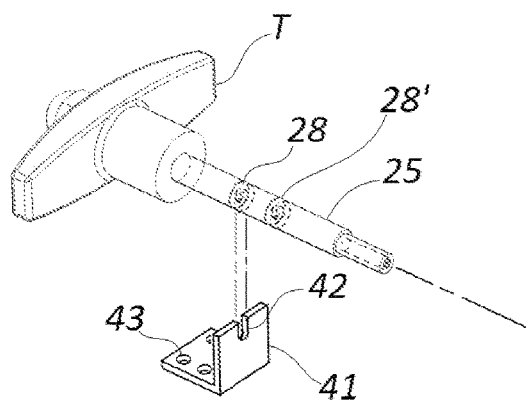

FIG. 4b shows an alternative embodiment of a pull handle for the control handle assembly of FIG. 4a. The control handle in this embodiment includes a shank [25] having a first diameter and a groove within which resides a surface [28] of a second diameter smaller than the first diameter. A holding bracket [41] includes attachment affordances [43] so that it may be fastened to a frame or other structure, and the bracket having a pierce feature [42] within which that smaller-diameter surface is receivable. A user may pull the handle [T] and rather than hold against the accumulated spring forces in the set of latch pin assemblies controlled by the handle, the user may insert the smaller surface within the groove of the shank into the pierce feature where it may dwell unattended. The dwell point may be determined to pulls a certain subset of the latch pins so as to release a particular subset of the parts normally retained by the latch pins. In alternative embodiments, more than one such groove may be placed along the shank to offer other dwell locations such as at [28'.]

Figure 4C:
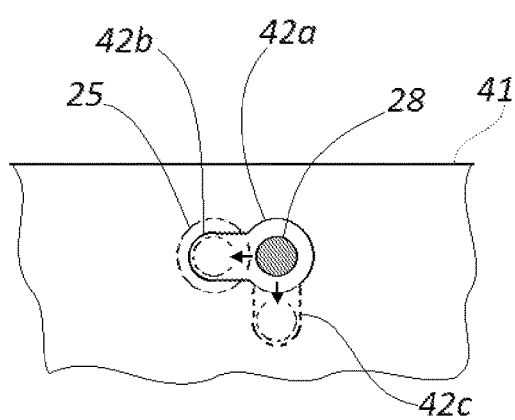
FIG. 4c shows an alternative pierce feature for a bracket used in the control handle assembly seen in FIG. 4b.

FIG. 4c shows an alternative pierce feature for a bracket [41] used in the control handle assembly seen in FIG. 4b. a pierce feature in this specification may be a hole or aperture having a closed contour passing through the planar membrane of the bracket, or it may be a notch or a slot having an open contour communicating with a perimeter of the planar membrane of the bracket. A closed contour may also be formed like a keyhole slot having a first portion [42a] with a diameter larger than the shank diameter [25] and a second portion [42b] with a diameter slightly larger than the surface [28] in the groove of the shank bur smaller than the shank diameter, so that the T handle is trapped within this bracket but may be extended and retracted while the shank passes through the larger diameter portion but may also be held at a dwell position by sliding its grooved portion into the smaller, second portion of the keyhole slot. The slot may be oriented laterally as show, or may be oriented vertically with the second portion [42c] shown in phantom line, whereby the handle may be pulled and then a groove site of the shank may be dropped into the keyhole slot and be retained therein by gravity.

In yet another set of embodiments within the scope of the invention, the surface residing within the groove of the shank may also include one or more planar faces similar to the latch pin cross section seen in FIG. 8, with the pierce feature also comprising complementary planar features so that when the T-handle is received in the pierce feature of the bracket, the T-handle may be locked from rotation.

Figure 5A:
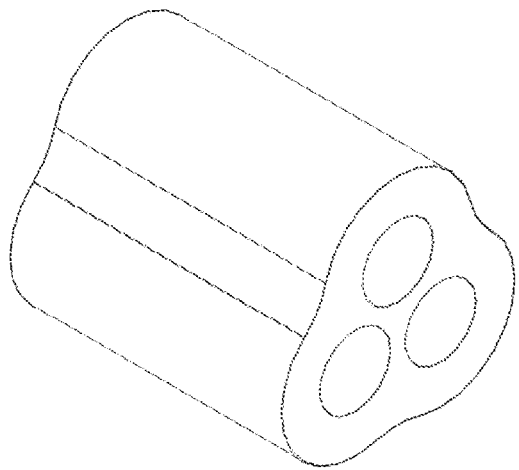
FIG. 5a shows a cable guide component for a control handle assembly in accordance with the invention configured for three control wires.

FIG. 5a shows a cable guide component or ferrule for a control handle assembly in accordance with the invention configured for three control wires. This ferrule has three lumina, one for each of the wires. A triangular orifice in the cup having filleted corners would receive the external cross section of this embodiment of a ferrule.

Figure 5B:
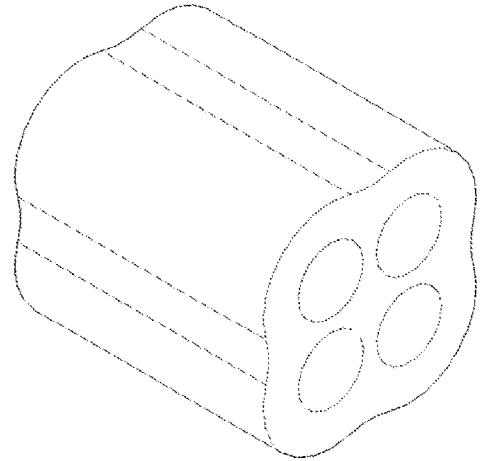
FIG. 5b shows a cable guide component for a control handle assembly in accordance with the invention configured for four control wires.

FIG. 5b shows a cable guide component or ferrule for a control handle assembly in accordance with the invention configured for four control wires. This ferrule has four lumina, one for each of the wires. A square orifice in the cup having filleted corners would receive the external cross section of this embodiment of a ferrule.

Figure 5C:
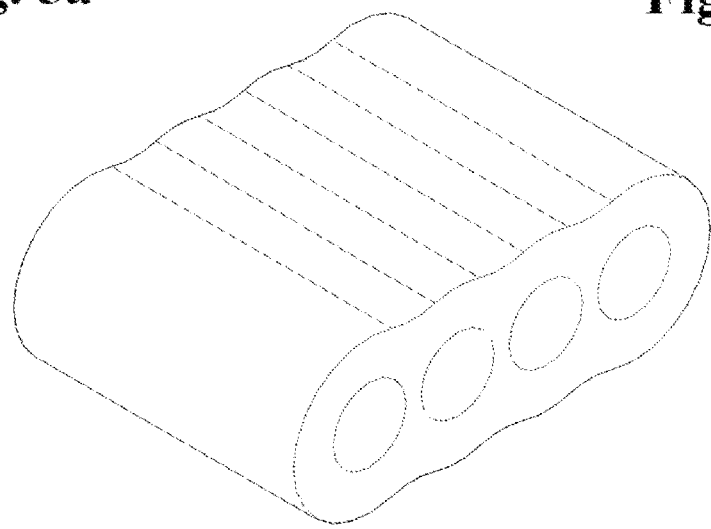
FIG. 5c shows an alternative cable guide component for a control handle assembly in accordance with the invention configured for four control wires.

FIG. 5c shows an alternative cable guide component for a control handle assembly in accordance with the invention configured for four control wires. This ferrule also has four lumina, one for each of the wires. A long, oval slot orifice in the cup having receive the external cross section of this embodiment of a ferrule.

Each of the above non-round ferrules in FIGS. 5a, 5b, and 5c would, when received into its complementary non-round orifice in the cup, effectively resist rotation and prevent crossing up of the portions of the control lines in motion within the cup when the handle is pulled or released.

Figure 6:
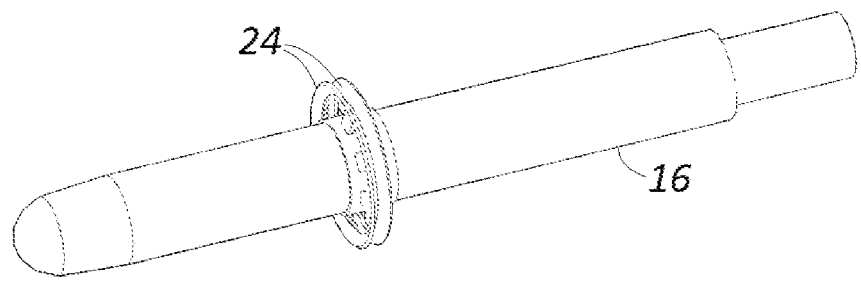
FIG. 6 shows an oblique view of an alternative embodiment of a latch pin in accordance with the invention.

FIG. 6 shows an oblique view of an alternative embodiment of a latch pin in accordance with the invention. When not using additive manufacturing or additive assembly techniques such as or brazing or press fitting a ring onto a rod, machining a rod with a medial flange of a diameter greater than the other diameters of the rod would usually waste a substantial amount of material such as chips lost to swarf if turned on a lathe. Material waste may be economically minimized by instead fashioning the rod [16] to have only a minimal additional diameter where the medial flange is desired and installing one or preferably two push nuts [24] to comprise the medial flange. A preferable orientation of two push nuts is the addorsed configuration shown in this figure.

Figure 7:
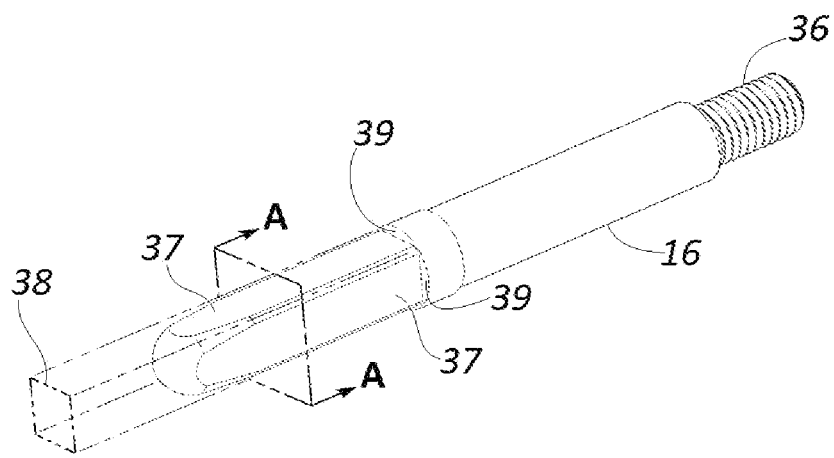
FIG. 7 shows an oblique view of another alternative embodiment of a latch pin in accordance with the invention, and defined cutting plane A-A for the cross section view of FIG. 8.

FIG. 7 shows an oblique view of another alternative embodiment of a latch pin [16] in accordance with the invention, and defines cutting plane A-A for the cross section view of FIG. 8. The latch pin may include threads [36] at either or both of its ends. The min may include a polygon cross section along a part of its tip directed to seating into a polygon aperture [38,] which allows the pin to enforce X-Y location and a rotational orientation of the part being held. Taking planar cuts [37] from a round pin that substantially inscribe a polygon but leave rounded corners or filleted or chamfered corners will also provide the same novel advantage. The transition shoulder surfaces [39] where the planar polygonal cross section ends and transitions to a larger diameter round portion act as an internal extension stop within barrel (feature [18] of FIG. 3.)

In embodiments such as depicted here, the barrel may also include a polygonal aperture at its end face where the pin emerges to engage the part being seized. The polygon aperture [38] may be rotationally stabilized both at the barrel end and in the part being seized to lock the part from rotation. The polygon may be a square, a rectangle, a hexagon, or another regular or irregular polygon.

FIG. 8 shows a cross section view of another alternative cross section for a latch pin in accordance with the invention. A latch pin [16] selected from among the set of at least one latch pin assemblies further comprises an arcuate portion [37b] concentric with other cylindrical portions of the pin and at least two parallel planar surfaces [37a.] Preferably, the planar surfaces may be chamfered or filleted [37c] where they meet the largest diameter surface of the latch pin. This type of pin cross section may be used to engage within a longitudinal slot in a part being seized or controlled by the system.

Figure 9:
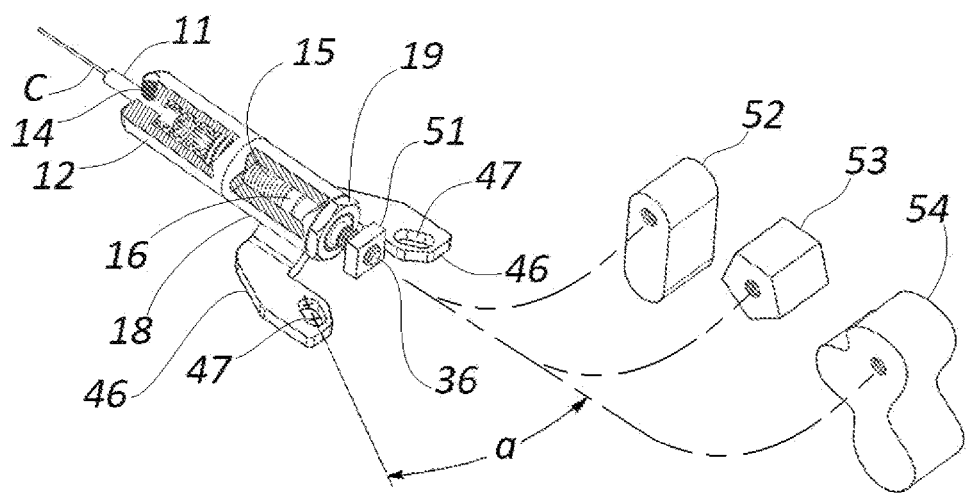
FIG. 9 shows an alternative embodiment of a latch pin assembly in accordance with the invention which is configurable to mount a probe point comprising any from among a variety of cross sections.

FIG. 9 shows an alternative embodiment of a latch pin assembly in accordance with the invention which is configurable to mount a probe point comprising any from among a variety of cross sections. The control cable [C] enters the latch pin assembly through a cup [12] having threads to couple to a barrel component [18.] At the entry point, the cable passes through a stop tube [11] secured to the cup by a setscrew [14] to leave an axially adjustable cap between it and a latch pin [16] which in this type of embodiment ends with threads [36] at its tip. A longitudinally compressible member [15] such as a coil spring is disposed within the cup and the barrel. A nut [19] threadably engages onto a set of external threads on the barrel for securing the latch pin assembly to a frame or a plate.

If a separate frame or plate is not required, the assembly may be recited as one from among the set of at least one latch pin assemblies which comprises a tube [18] defining a first longitudinal axis, and with a plate [46] attached to the tube. The plate includes a slot [47] defining a second longitudinal axis angularly offset from the first longitudinal axis by an angle [a] shown in the figure. More than one slotted plate may be attached to the barrel or tube to secure it to a frame.

A square nut [51] may be used to engage in a long slot or a square aperture of a part being controlled. An lozenge or oblong probe plug [52] may also interoperate with a part having a slot. Regular or irregular polygons such as the pentagon [53] shown may also be used, in addition to other probe plugs having irregular or arbitrary shapes [54.] The probe plugs include threaded apertures for attachment to the latch pin. A variety of aperture shapes and complementary latch pin end probe plugs may be used where multiple varieties of parts pass along a material handling system, and staged extensions and retractions of the latch pins within the system may be used to detain certain classes of parts, such as for inspection or acceptance, while other classes are allowed to pass.

Figure 10A:
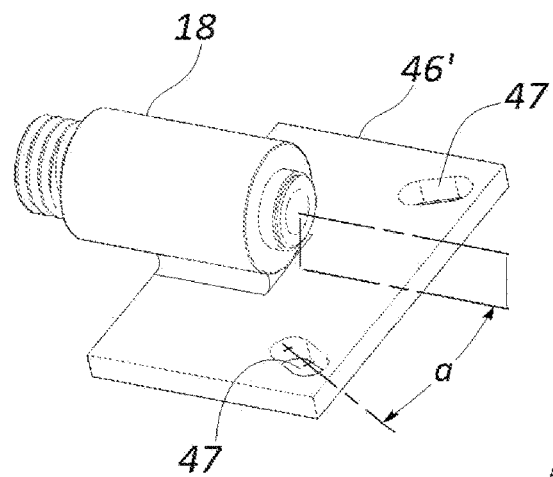
FIG. 10a shows an alternative embodiment of a component of a latch pin assembly comprising a tube and a plate affixed to the tube which has at least one slot angularly offset from the tube axis.

FIG. 10a shows an alternative embodiment of a component of a latch pin assembly comprising a tube or barrel [18] defining a first longitudinal axis, and a plate [46'] affixed to the tube which has at least one slot [47] defining a second longitudinal axis angularly offset from the first longitudinal axis of the tube by an angle [a.] The plate may be permanently affixed to the barrel such as by welding or adhesive.

Figure 10B:
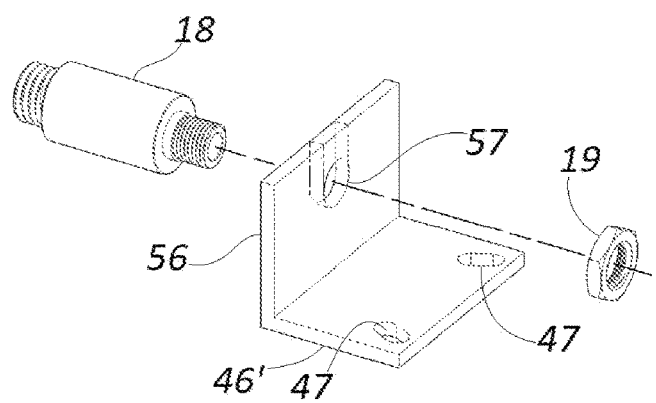
FIG. 10b shows another alternative embodiment of components of a latch pin assembly comprising a tube or barrel and wherein the plate having at least one slot defining a second longitudinal axis angularly offset from the first longitudinal axis of the tube is a distal plate portion of a bracket comprising a proximal plate having a pierce feature within which a portion of said tube is received.

FIG. 10b shows another alternative embodiment of components of a latch pin assembly comprising a tube or barrel [18] and wherein the plate [46'] having at least one slot [47] defining a second longitudinal axis angularly offset from the first longitudinal axis of the tube is a distal plate portion of a bracket comprising a proximal plate [56] having a pierce feature [57] within which a portion of said tube is received. The threaded portion of the barrel passes through the pierce feature and is secured to the bracket by a nut [19.] As seen in FIGS. 4b and 4c, the pierce feature may be a hole, keyhole slot, or other aperture having a closed contour passing through the planar membrane of the bracket, or it may be a notch or a slot (as shown in phantom line) having an open contour communicating with a perimeter of the planar membrane of the bracket.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. The multiple latch pin cable release mechanism described herein has many useful applications in many different industries and mechanical assemblies beyond the examples illustrated and described herein. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A cable release mechanism comprising a control handle assembly, a set of at least one retractable latch pin assembly, and at least one control cable connected from said control handle assembly to said latch pin assembly, wherein:
   said control handle assembly further comprises
      a cup with
         a first longitudinal aperture extending from a first end to a second end, with said aperture having internal threads at said first end and a non-round orifice at said second end,
      a rod partially received within said longitudinal aperture of said cup, and
      a handle rotatably coupled to said rod.

2. The cable release mechanism of claim 1, wherein said cup further comprises a second transverse aperture having internal threads and communicating with said longitudinal aperture.

3. The cable release mechanism of claim 1, further comprising a non-round tube complementary to said non-round orifice of said cup, with said non-round tube further comprising at least one lumen.

4. The cable release mechanism of claim 3, further comprising a wire rope connected to one from among said set of at least one retractable latch pin assembly, passing through said lumen of said non-round tube, and received into an aperture in said rod.

5. The cable release mechanism of claim 1, further comprising a coupling having a first set of external threads received within said internal threads of said cup and a second set of external threads received within a nut.

6. The cable release mechanism of claim 1, wherein said rod passes through said handle and further comprises external threads received within a cap nut.

7. The cable release mechanism of claim 1, said control handle further comprising a shank having a first diameter and a groove within which resides a surface of a second diameter smaller than said first diameter, and with said cable release mechanism further comprising a bracket having a pierce feature within which said surface is receivable.

8. The cable release mechanism of claim 1, wherein a latch pin from among said set of at least one latch pin assemblies further comprises at least two parallel planar surfaces.

9. The cable release mechanism of claim 1, wherein one from among said set of at least one latch pin assemblies comprises a tube defining a first longitudinal axis, and a plate attached to said tube, with said plate comprising a slot defining a second longitudinal axis angularly offset from said first longitudinal axis.

10. The cable release mechanism of claim 9, wherein said plate is a distal plate portion of a bracket comprising a proximal plate having a pierce feature within which a portion of said tube is received.

11. The cable release mechanism of claim 9, wherein said plate is a distal plate portion of a bracket comprising a proximal plate having a pierce feature within which a portion of said tube is received.

12. A cable release mechanism comprising a control handle assembly, at least one retractable latch pin assembly, and at least one control cable connected from said control handle assembly to said latch pin assembly, wherein:
said latch pin assembly further comprises
a cup with
a first longitudinal aperture extending from a first end to a second end, with said aperture having internal threads at said first end and a second transverse aperture having internal threads and communicating with said longitudinal aperture,
a retractable rod partially received within said longitudinal aperture of said cup, with said rod further comprising a first diameter and
a first end having a rounded tip,
a second end having an aperture, and
a medial flange of a diameter greater than said first diameter of said rod, and
a longitudinally compressible member disposed between said medial flange of said rod and said second end of said cup.

13. The cable release mechanism of claim 12, wherein said first end of said rod of said retractable latch pin assembly further comprises a tapered conical section.

14. The cable release mechanism of claim 12, wherein said retractable latch pin assembly further comprises a barrel having first and second ends and first and second external threads at its respective ends, with said first external threads of said barrel received within said internal threads of said cup.

15. The cable release mechanism of claim 14, further comprising a nut threadably engaged to said second external threads of said barrel.

16. The cable release mechanism of claim 12, further comprising a tube partially received within said longitudinal aperture of said cup.

17. The cable release mechanism of claim 16, further comprising a wire rope connected from said control handle assembly to said at least one retractable latch pin assembly, with said wire rope passing though said tube and said longitudinal aperture of said cup.

18. The cable release mechanism of claim 17, wherein said wire rope is received within said aperture of said retractable rod.

19. The cable release mechanism of claim 12, said control handle further comprising a shank having a first diameter and a groove within which resides a surface of a second diameter smaller than said first diameter, and with said cable release mechanism further comprising a bracket having a pierce feature within which said surface is receivable.

20. The cable release mechanism of claim 12, wherein said medial flange comprises at least one push nut.

21. The cable release mechanism of claim 12, wherein a latch pin from among said set of at least one latch pin assemblies further comprises at least two parallel planar surfaces.

22. The cable release mechanism of claim 12, wherein one from among said set of at least one latch pin assemblies comprises a tube defining a first longitudinal axis, and a plate affixed to said tube, with said plate comprising a slot defining a second longitudinal axis angularly offset from said first longitudinal axis.

* * * * *